United States Patent [19]

White

[11] 4,097,011

[45] Jun. 27, 1978

[54] ENGINE MOUNT

[75] Inventor: Robert F. White, Speedway, Ind.

[73] Assignee: General Motors Corporation, Detroit, Mich.

[21] Appl. No.: 815,108

[22] Filed: Jul. 13, 1977

[51] Int. Cl.² .......... B64D 27/26

[52] U.S. Cl. .......... 248/5; 248/358 R

[58] Field of Search .......... 248/5, 8, 9, 15, 18, 248/20, 21, 22, 358 R; 244/54

[56] References Cited

U.S. PATENT DOCUMENTS

| | | | |
|---|---|---|---|
| 1,815,170 | 7/1931 | Summers | 248/21 |
| 2,638,303 | 5/1953 | Pietz | 248/22 X |
| 3,035,799 | 5/1962 | Peirce | 248/15 |

FOREIGN PATENT DOCUMENTS

| | | | |
|---|---|---|---|
| 979,958 | 12/1950 | France | 248/5 |
| 408,123 | 12/1944 | Italy | 248/15 |
| 98,950 | 5/1940 | Sweden | 248/5 |

*Primary Examiner*—Lawrence J. Staab
*Attorney, Agent, or Firm*—J. C. Evans

[57] ABSTRACT

A gas turbine engine acoustic noise damping mount on a helicopter airframe includes a first outboard washer assembly with metallic inner and outer washers having a thin layer of elastomer bonded therebetween; an inboard bushing assembly has telescoped inner and outer metallic bushings with a thin layer of elastomer bonded therebetween; an engine trunnion is supported by the inner bushing; and flat inboard faces on the washer assembly and inboard bushing assembly are held against either side of an airframe strut by a nut threaded to the trunnion. The inboard bushing assembly includes a tubular extension pilot guided within an engine strut whereby the thin layers of elastomer serve to interrupt transmission of structure borne sound from engine to airframe.

2 Claims, 3 Drawing Figures

ENGINE MOUNT

This invention relates to engine mounts and more particularly to engine mounts for isolating gas turbine engine noise transmission through engine support struts to a cockpit of an associated aircraft.

Various engine mount configurations have been proposed to support a gas turbine engine on an airframe support system.

One example of such a system includes positioning a support tube at a location within a tube having a resilient isolater therebetween of the type set forth in U.S. Pat. No. 2,891,743 issued June 23, 1959, to Bligard et al. Another tube within a tube type configuration is set forth in U.S. Pat. No. 2,661,593 issued Dec. 8, 1953, to Hughes et al. While these arrangements are suitable for their intended purpose they are relatively complex and require separate connectors to locate the support system with respect to the airframe strut component.

Another well known vibration isolator unit that is interposed between a supporting frame and a mounted engine, usually an internal combustion engine, is a multi-directional resilient unit of the type set forth in U.S. Pat. No. 2,538,954, issued Jan. 23, 1951, to Efromson et al. Such units are utilized to isolate low frequency vibrations of the type found in internal combustion engine application and furthermore require the provision of a plurality of separate bolts and nuts to secure a rigid connecting flange onto either the supported or supporting structure.

An additional class of isolater units are shock mounts mounted between a machine base and a support platform. Examples of such resilient mount configurations are set forth in U.S. Pat. No. 2,399,414, issued Apr. 30, 1946, to Wells et al and U.S. Pat. No. 2,708,560 issued May 17, 1955, to Paley.

While the aforesaid engine and shock mount configurations are all suitable for their intended purpose, they are either relatively complex or require elaborate fasteners or excessive amounts of space to accommodate the parts thereof and can cause drive train misalignment.

Therefore, an object of the present invention is to provide an improved, low cost, easily assembled engine mount for isolating high frequency noise vibrations generated within a gas turbine engine from an engine strut system for supporting the engine adjacent a passenger compartment therein and to provide such an engine mount having a bushing assembly and a washer assembly each having metallic inboard surfaces thereon held in frictional engagement on either side of an engine strut by means of a nut secured to one end of a threaded engine mount trunnion and wherein a resilient layer of elastomeric material is bonded to each of the inboard surfaces and supporting outer surfaces and wherein one of the inboard surfaces has a centering bore for a tubular extension on the other of the inboard surfaces thereby to center the elastomeric material with respect to the struts for controlling relative movement between the engine and the strut so as to reduce transmission of high frequency noise.

Yet another object of the present invention is to provide an improved noise isolation mount assembly for isolating high frequency gas turbine engine gear train vibrations from a gas turbine strut adjacent a passenger compartment comprising an engine trunnion connected to the gas turbine engine having a threaded end thereon and surfaces to supportingly receive a double walled, resilient bushing and a double walled resilient washer each having inboard faces thereon held in frictional engagement with the strut by means of an external nut on a threaded end of the trunnion and further including layers of elastomeric material between the double walls of the bushing and washer and wherein the inboard walls of the bushing is formed as a tubular extension having a smaller diameter than that of a support opening in the strut and wherein the resilient double walled washer has a centering bore formed in its inboard wall for supportingly receiving the tubular extension on the bushing to center it into contact with the strut and whereby the strut also contacts flat radially outwardly directed planar segments of inboard walls of the bushing and washer and wherein the elastomeric material has a resiliency to control movement between the strut and the engine trunnion mount and to secure them together by a resilient coupling that will isolate high frequency gear noise transmission from the engine trunnion to the support strut.

Further objects and advantages of the present invention will be apparent from the following description, reference being had to the accompanying drawings wherein a preferred embodiment of the present invention is clearly shown.

Figure 1:
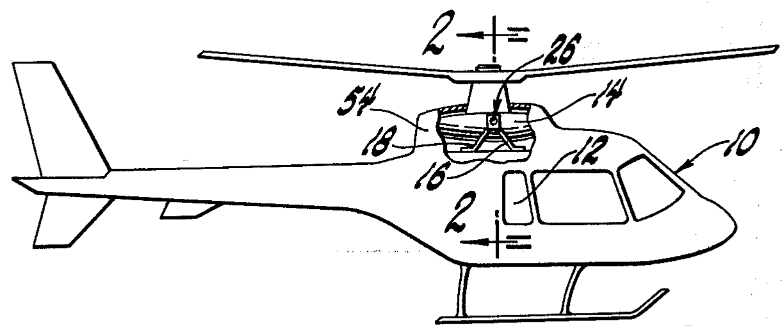
FIG. 1 is a view in perspective of a gas turbine engine and associated helicopter engine strut system including the noise isolation mount assembly of the present invention.

FIG. 1 shows a helicopter 10 having a central cockpit 12 that is located closely adjacent a gas turbine engine 14, for example, a Detroit Diesel Allison gas turbine engine, Model 250C20B. The gas turbine engine 14 is supported on a strut system including a pair of struts 16, 18 each having one end thereof connected to the frame of the helicopter 10 and having the opposite end thereof joined at an apex 20.

The apex 20 has a pair of concentric bores 22, 24 formed in the struts 16, 18, respectively. In the illustrated arrangement, the apex 20 is connected by an improved noise isolation mount assembly 26 to an engine support trunnion 28 connected to a wall 30 of the engine 14.

More particularly, the trunnion 28 includes a hub 32 supported within an opening 34 of the wall 30. An outboard flange 36 of trunnion 28 is suitably connected to the engine wall 30 by bolts or the like. The flange 36 includes an outwardly directed spindle 38 thereon.

Spindle 38 includes an outboard shoulder 40 thereon in circumferential surrounding relationship to a smaller diameter, outwardly extending connector stud 41 having a threaded end 42 thereon.

The noise isolation mount assembly 26 is supported on the trunnion 28 and located in a compact, sandwiched relationship to outside surfaces 44, 46 on the struts 16, 18 respectively by means of a nut 48 threadably received on the threaded end 42 of the stud 41.

More particularly, the noise isolation mount assembly 26 includes (referenced to wall 30) an inboard located resilient bushing assembly 50 and an outboard resilient washer assembly 52 each constituting a joined unit that is readily fit with respect to the trunnion 28 and the apex 20 of the strut 16, 18 so as to maintain a sandwiched inter-relationship between the parts thereby occupying a limited amount of space on the end of the trunnion 28 so that gas turbine engine 14 can be accommodated within tight spaces as for example those found within a nacelle 54 for engine 14.

Figure 2:
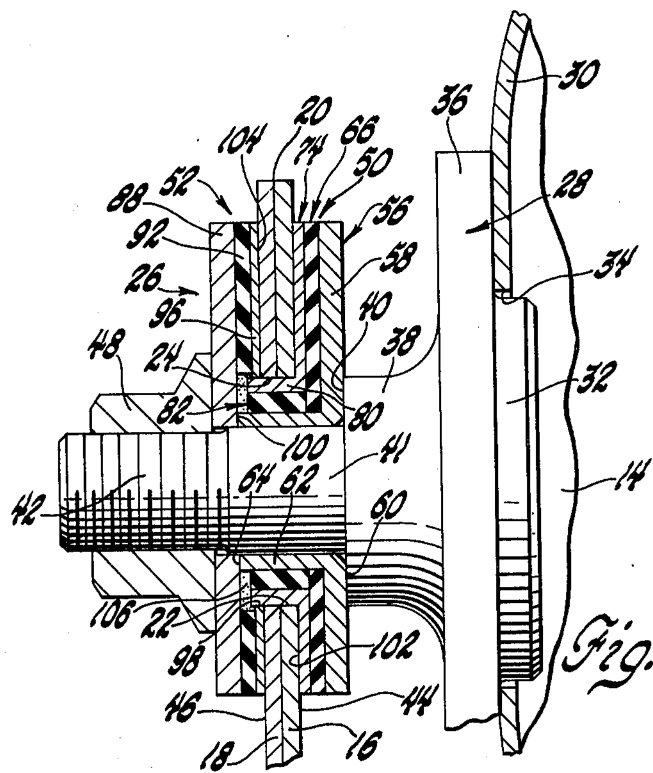
FIG. 2 is an enlarged fregmentary cross-sectional view taken along the line 2—2 of FIG. 1 showing the noise isolation mount assembly of the present invention.
Figure 3:
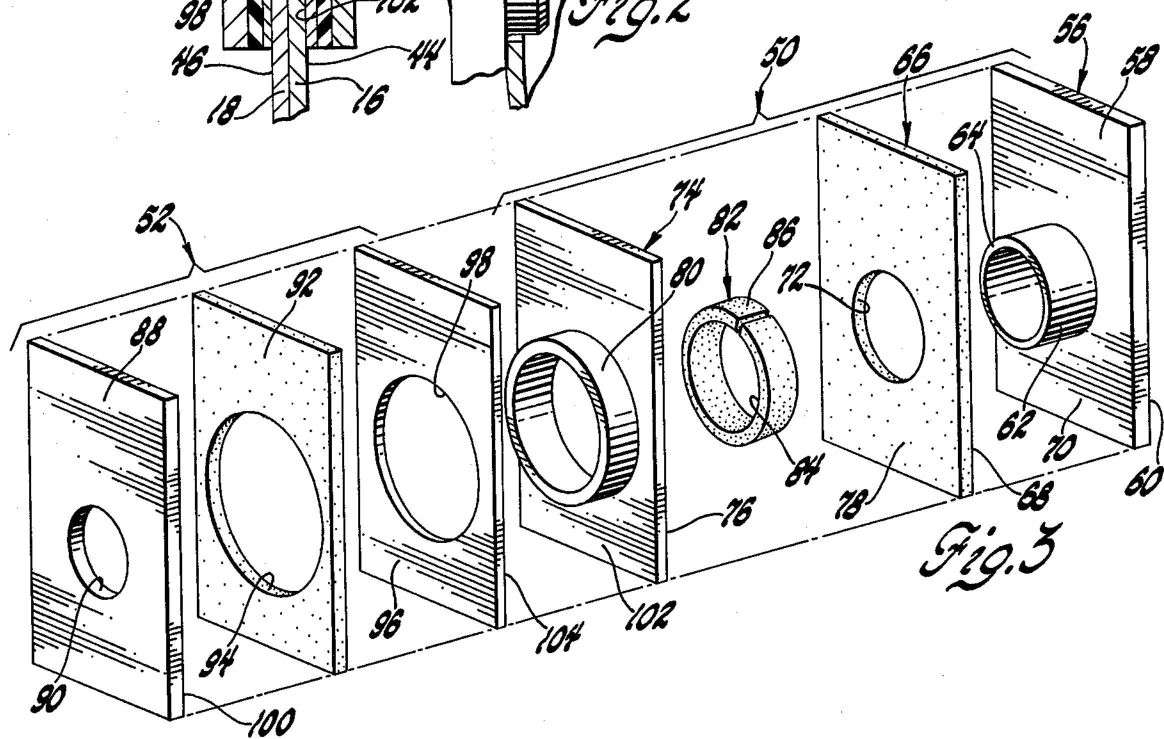
FIG. 3 is an exploded view of the component parts of the noise isolation mount assembly in FIG. 2.

The resilient bushing assembly 50 includes a metallic inner support bushing 56 with rectangularly configured flat plate 58 with a rear surface 60 that contacts the shoulder 40 as shown in FIG. 2. The plate 58 includes an integrally formed, tubular extension or pilot tube 62 thereon which has an inside diameter corresponding to the outside diameter of the stud 41 to locate the bushing 56 in a tight pilot fit relationship thereon. The tubular extension 62 has a locater end surface 64 thereon which serves as a stop limit to compression of resilient components within the bushing assembly 50 and washer assembly 52, as will be discussed.

Additionally, the resilient bushing assembly 50 includes a flat layer 66 of resilient material, preferably a hard elastomeric material such as Viton, a trademark of DuPont Company. A rear surface 68 of layer 66 has a planar extent corresponding to the front surface 70 on the bushing 56. Furthermore, layer 66 includes a central bore 72 therethrough with an inside diameter corresponding to the outside diameter of the tubular extension 62. Preferably, the rear surface 68 is bonded to the front surface 70 and extension 62.

An outboard bushing 74 includes a rear surface 76 bonded to the front surface 78 of the resilient flat layer 66. It further includes an integral tubular extension or pilot tube 80 thereon with an outside diameter slightly less than that of the bores 22, 24 through the apex 20 of the struts 16, 18, thereby to provide a pilot fit therebetween. The tubular extension 80 supportingly receives a ring 82 of resilient elastomeric material. Ring 82 has an inside diameter surface 84 thereon which is bonded to the outside diameter of the extension 62. The outside diameter 86 of ring 82 is bonded to the inside diameter of the tubular extension 80 and serves to isolate vibration of the stud 41 radially with respect to the bores through the apex 20.

The joined bushing 56, resilient layer 66, ring 82 and outboard bushing 74 are thus bonded together and joined as a single unit separately located on the stud 41 and against the shoulder 40 to serve as one half of the noise isolation mount assembly 26. Vertical engine load is transmitted via ring 82 and bushing 56 to be supported in part by placing layer 66 in shear.

The other half of the noise isolation mount assembly 26 is defined by the resilient washer 52. It includes an outboard plate 88 having a small diameter bore 90 therein corresponding to the outside diameter of the stud 41. It is bonded to a layer 92 of resilient material like layer 66. Layer 92 has a large diameter opening 94 therein which exceeds the outside diameter of the tubular extension 80 on the outboard bushing 74 of the resilient bushing assembly 50. Accordingly, the resilient layer 92 is physically isolated from the bushing assembly 50 to allow room for expansion of compressed elastomer. The washer 52 further includes a metallic, inboard plate 96 bonded to the opposite face of the resilient layer 92. Wall 96 has a controlled diameter bore 98 therein corresponding to the outside diameter of the tubular extension 80. Thus, vertical engine load is supported, in part, by load transfer from extension 80 to plate 96 to layer 92 which is thereby placed in shear.

More particularly, when the isolation mount assembly 26 is located on the trunnion 28, first the bushing assembly 50 is located in place thereon. Then the tubular extension 80 is piloted through the bores 22, 24 in strut apex 20. In the present invention, the bore 90 of the resilient washer assembly 52 is piloted on stud 41 to serve as a locater to center the bore 98 in the plate 96 of the washer assembly 52 concentrically and in radially spaced relationship with respect to the outer diameter of the stud 41. Furthermore, bore 98 in washer assembly 52 is supportingly received in a pilot fit relationship with the outer peripheral surface of the extension 80 to transmit vertical load from engine 14 to the layer 92.

In addition to having a configuration which will center and space the parts with respect to the trunnion 28, the washer assembly 52 is configured so that the rear surface 100 of the outboard plate 88 will contact the end surface 64 on the extension 62 as shown in FIG. 2 and serve as a limit stop against excessive compression of the resilient layers 66, 92 when the parts are held in place by the nut 48.

The stop location is such that the resilient layers 66, 92 will be held in a tight compressed relationship so as to locate the front surface 102 of the outboard bushing 74 and the rear surface 104 of the wall 96 in engagement with the outside walls 44, 46, respectively, to fixedly connect the noise isolation mount assembly 26 on the apex 20 of the strut. The joined parts define an annular space 106 as shown in FIG. 2 into which the layer 92 and ring 82 can be deformed during controlled compression as the castle nut 48 is threadably drawn onto the stud 41.

In one working embodiment the aforedescribed assembly was found satisfactory to isolate transmission of high frequency engine noises in the order of 5000 Hertz from the engine 14 to the cockpit 12 via the support struts 16, 18. This isolation reduces noise level in a cabin area in the order of 12 dB at the noisiest cabin location. Average noise reduction throughout the cabin is in the order of 8 dB. The aforesaid noise data was obtained in a test aircraft during straight and level flight at 110 mph. The noise pick-up was a microphone positioned at ear level of a seated passenger.

The struts 16, 18 in a standard mount are hard connected (metal-to-metal) to a gearbox mounting pad on the engine 14, thence to the primary aircraft structure. Such a system represents a typical structural path with excessive noise transmission. The aforedescribed mount assembly 26 defines a substantial impedance change to block noise transmission in such paths.

Furthermore, by way of summary, the mount assembly 26 has a unique configuration with sufficient stiffness to minimize mounted engine resonance. Typically, the engine drive shaft has a short length and any excessive yield in the elastomeric components could cause shaft misalignment. The aforesaid stiffness prevents misalignment of the engine drive shaft with the input to a gear drive for the helicopter.

The unit is of small size and requires minimum rework of existing structure and is easy to install.

Other features include bottoming of the mount nut 48 through a metal-to-metal path; i.e., plate 88, extension 80, bushing 56 to shoulder 40. This permits retention of torque levels found in prior metal-to-metal supports.

In the present arrangement, however, there is no metal-to-metal path for structure borne noises. Most of the engine load is carried through the aforedescribed elastomeric sandwich, layers 66, 92, in shear.

The finished mount assembly 26 is essentially a concentric spool shape with steel end plates and a core of elastomer. The unit is easily fabricated as two bonded subassemblies. Rework of standard metal-to-metal mounts includes drilling an oversized hole in the struts and undercutting shoulder 40 to accommodate the axial thickness of mount *26*. The illustrated rectangularly configured mount parts are representative, it being understood that other shapes are equally suitable so long as the load transfer "foot-print" is satisfactory to produce desired unit bearing loads.

While the embodiments of the present invention, as herein disclosed, constitute a preferred form, it is to be understood that other forms might be adopted.

The embodiments of the invention in which an exclusive property or privilege is claimed are defined as follows:

1. A noise isolation mount assembly for association with an engine and an opposite sided engine support strut for isolating structure borne transmission of high frequency gas turbine engine vibrations from the engine through the strut and into a passenger compartment comprising: a trunnion fixedly connected to the gas turbine engine, said trunnion having a locater shoulder and an outboard stud with a fastener end, a double-walled resilient bushing seated on said locater shoulder and including a first layer of elastomeric material bonded within the double-walled bushing to isolate noise vibration therebetween, said double-walled bushing including an integral, inner pilot tube close fit on said stud and further including an outboard bushing with an integral outer tubular extension arranged concentrically of said inner pilot tube and close fit within an engine strut, a double-walled resilient washer having a bore therethrough fit on said stud, said double-walled resilient washer including a second layer of elastomeric material bonded within the double-walled washer for allowing movement therebetween and to isolate high frequency noise transmission therebetween, and connector means connected to said fastener end to press said resilient double-walled washer and said outboard bushing against opposite sides of the engine strut to radially pilot the strut with respect to said trunnion, said inboard pilot tube being in contact with the outboard one of the double walls of said resilient washer to rigidly couple the trunnion and said connector means, an inboard one of the double walls of said resilient washer being supported on said outer tubular extension, and means for resiliently supporting said outer tubular extension on said trunnion to cause engine loads radially of said trunnion to be transferred into said inboard one of the double walls of said resilient washer and into said outboard bushing to cause said first and second layers of elastomeric material to be placed in shear to support the aforesaid engine loads and to maintain a vibration isolation break between said trunnion and the strut thereby to reduce structure borne transmission of noise between the engine and the strut.

2. A noise isolation mount assembly for association with an engine and an opposite sided engine support strut for isolating structure borne transmission of high frequency gas turbine engine vibrations from the engine through the strut and into a passenber compartment comprising: a trunnion fixedly connected to the gas turbine engine, said trunnion having a locater shoulder and an outboard stud with a fastener end, a resilient bushing seated on said locater shoulder, said resilient bushing including an outboard wall with an integral, inner pilot tube close fit on said stud and further including an outer bushing with an integral outer tubular extension arranged concentrically of said inner pilot tube and close fit within an engine strut, a first layer of elastomeric material bonded to said outboard wall and said outer bushing to isolate noise vibration transmission between said pilot tube and said outer bushing, a resilient washer having an inboard and outboard wall and a bore therethrough fit on said stud, said resilient washer including a second layer of elastomeric material bonded to said inboard and outboard walls of said resilient washer to isolate noise vibration transmission therebetween, and connector means connected to said fastener end to press said resilient washer and the outer bushing against opposite sides of the engine strut to radially pilot the strut with respect to said trunnion, said inboard pilot tube being in contact with the outboard wall of said resilient washer to rigidly couple the trunnion and said connector means, said inboard wall of said resilient washer being supported on said outer tubular extension, said outer tubular extension having a free end thereon in spaced relationship to said outboard wall of said resilient washer and also spaced from the inner pilot tube for defining an open space for accommodating elastomeric material displaced from said resilient bushing when said resilient washer is fastened in place against said strut, and means for resiliently supporting said outer tubular extension on said trunnion to cause engine loads radially of said trunnion to be transferred into said inboard wall of said resilient washer and into said outer bushing to cause said first and second layers of resilient material to be placed in shear to support the aforesaid engine loads and to maintain a vibration isolation break between said trunnion and the strut thereby to reduce structure borne transmission of noise between the engine and the strut.

* * * * *